United States Patent [19]

Boston et al.

[11] Patent Number: 5,329,664
[45] Date of Patent: Jul. 19, 1994

[54] CLEANING DEVICE FOR A THREADED SHAFT

[75] Inventors: William A. Boston; Frank A. Balow, both of Western Springs; Eugene Skipor, Hickory Hills, all of Ill.

[73] Assignee: Rockwell International Corporation, El Segundo, Calif.

[21] Appl. No.: 94,641

[22] Filed: Jul. 19, 1993

Related U.S. Application Data

[60] Continuation of Ser. No. 896,031, Jun. 8, 1992, abandoned, which is a division of Ser. No. 747,304, Aug. 19, 1991, Pat. No. 5,191,672.

[51] Int. Cl.⁵ .............................................. B21C 43/00
[52] U.S. Cl. ................................ 15/256.5; 74/424.8 B; 411/437

[58] Field of Search ........... 15/256.5, 246, 88, 104.04, 15/104.05, 236.07, 236.06; 74/424.8 B; 411/437, 427, 274, 300, 222, 937.1

[56] References Cited

U.S. PATENT DOCUMENTS

| | | | |
|---|---|---|---|
| 1,946,931 | 2/1934 | Chong | 15/236.07 |
| 2,580,170 | 12/1951 | Grimmer | 15/256.5 |
| 2,793,538 | 5/1957 | Sears | 15/256.5 |

Primary Examiner—Harvy C. Hornsby
Assistant Examiner—Reginald L. Alexander
Attorney, Agent, or Firm—C. B. Patti; H. F. Hamann

[57] ABSTRACT

A cleaning device (10) for a threaded shaft (12) having a cleaning member (34) having a threaded recess (42) received on the shaft (12) and extending partially around the shaft (12) with the threads (44) of the cleaning member (34) meshing with the threads (14) of the shaft (12).

1 Claim, 3 Drawing Sheets

5,329,664

CLEANING DEVICE FOR A THREADED SHAFT

This is a continuation of application Ser. No. 896,031, filed Jun. 8, 1992, now abandoned, a divisional of application Ser. No. 747,304, filed Aug. 19, 1991, now U.S. Pat. No. 5,191,672.

BACKGROUND OF THE INVENTION

The present invention relates to cleaning devices for a threaded shaft.

In the past, threaded screws or shafts have been used to linearly translate the position of a threaded member, such as a threaded block engaged with the threads of a shaft, in opposite directions depending upon the direction of rotation of the shaft, such as in a printing press. Although such devices have satisfactorily moved the block in selected opposite directions along the shaft, when operating the device in a dusty environment, dust and dirt may accumulate in the threads of the shaft, which hampers movement of the threaded shaft, and possibly jams the shaft such that it can no longer rotate in the block. Thus, the device must be stopped in this case, and the threads of the shaft must be cleaned prior to subsequent use, causing undesirable delays and inconvenience to the operator of the press or device.

SUMMARY OF THE INVENTION

A principal feature of the present invention is the provision of an improved cleaning device for a threaded shaft.

The cleaning device of the present invention comprises, a cleaning member having a threaded recess received on a threaded shaft and extending partially around the shaft, with the threads of the cleaning member meshing with the threads of the shaft.

A feature of the invention is that the cleaning member scrapes the threads of the shaft during rotation of the shaft.

Another feature of the invention is that the scraping by the member removes dirt and dust from the threads of the shaft.

Yet another feature of the invention is that the cleaning member has a shape to provide a scraping or cleaning edge contacting the shaft as it rotates in a direction towards the scraping edge.

Another feature of the invention is that the cleaning member may have a pair of spaced cleaning edges for scraping and removing the dust and dirt from the shaft during rotation of the shaft in opposite directions.

A further feature of the invention is that the cleaning device may comprise a pair of cleaning members, with each of the cleaning members scraping the threads of the shaft in opposite rotational directions of the shaft.

Yet another feature of the invention is that the cleaning device is of simplified structure and reduced cost.

A further feature of the invention is that the cleaning member may be easily placed and removed relative to the threaded shaft.

Still another feature of the invention is that the cleaning member may be snap-fit onto the threaded shaft.

Further features will become more fully apparent in the following description of the embodiments of this invention, and from the appended claims.

DESCRIPTION OF THE PREFERRED EMBODIMENTS

Figure 1:
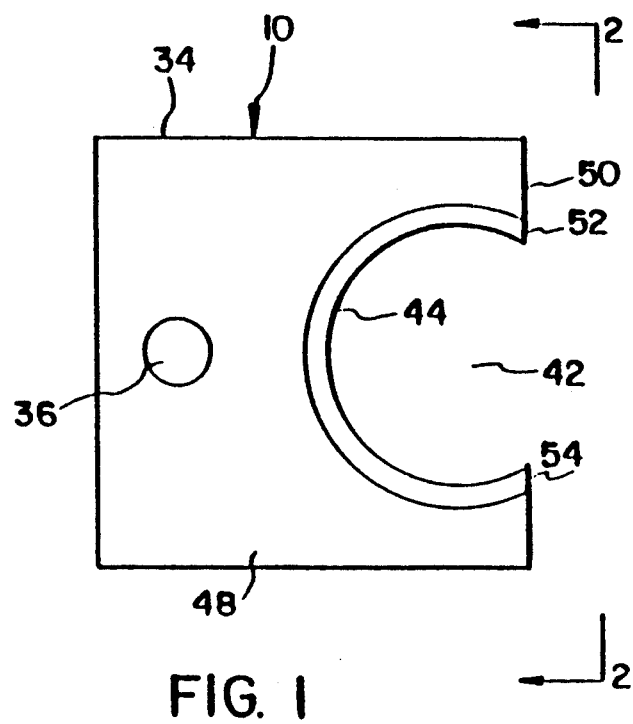
FIG. 1 is a plan view of a cleaning member for a cleaning device of the present invention.
Figure 2:
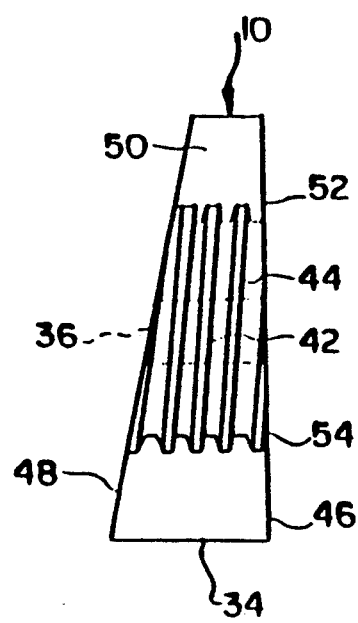
FIG. 2 is an end view of the cleaning member taken along the line 2—2 of FIG. 1.
Figure 3:
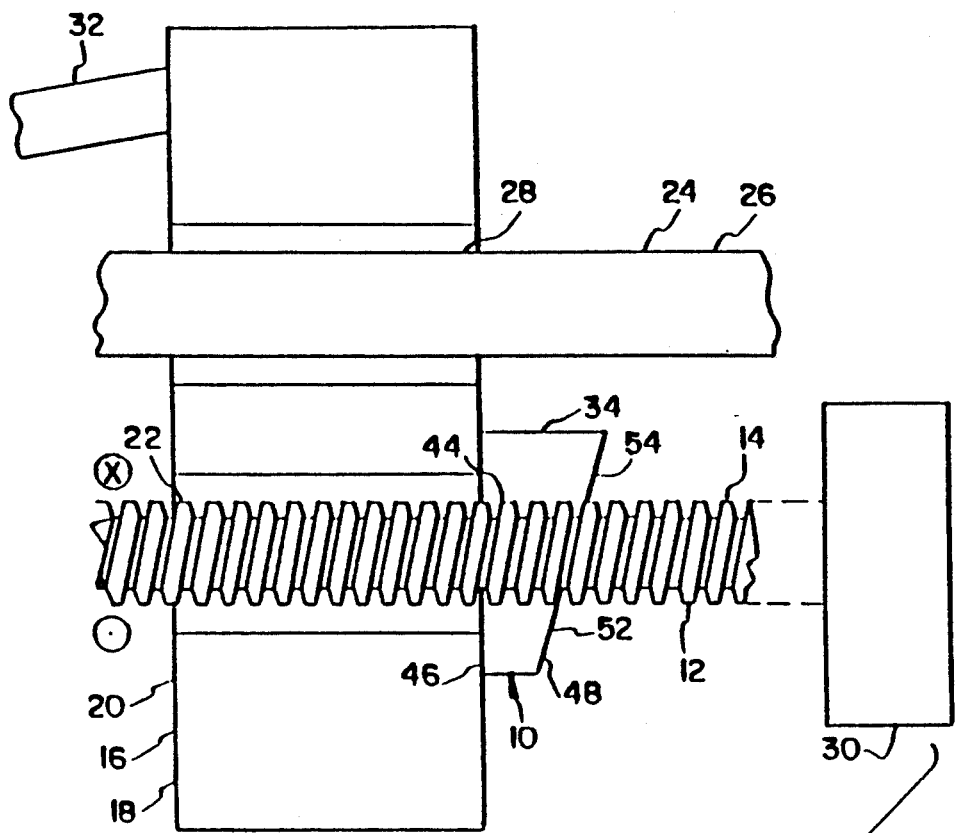
FIG. 3 is an elevational view, taken partly in section, of the cleaning member of FIG. 1 in a position for cleaning a threaded shaft.
Figure 3:
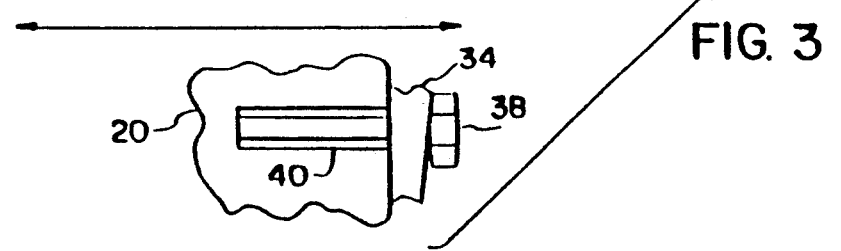

Referring now to FIGS. 1-3, there is shown a cleaning device generally designated 10 for a threaded shaft 12 of the present invention. The threaded shaft 12 has a helical or spiral thread 14, and is received in an apparatus 16, such as a printing press 18.

The apparatus 16 has a block 20 having a threaded bore 22 engaged and meshed with the threaded shaft 12. The apparatus 16 may have an elongated rod 24 having a smooth outer surface 26, and being slidably received in a bole 28 of the block 20. The apparatus 16 also may have a motor or hand wheel 30 associated with the threaded shaft 12 in order to rotate the shaft 12 in opposite directions. When the motor 30 is operated in a first rotational direction, the threaded shaft 12 is rotated in the block 20, and imparts linear movement of the block 20 in one direction longitudinally along the rod 24. When the shaft of the motor or hand wheel 30 is rotated in the opposite rotational direction, the shaft 12 rotates in the block 20, and moves the block 20 in an opposite linear direction longitudinally along the rod 24. In this manner, the motor or hand wheel 30 moves the block 20 in opposite linear directions along the rod 24. A suitable device 32 may be connected to the block 20, such as a folding arm of the printing press 18, in order to move the device 32 or arm longitudinally along the rod 24 in opposite directions.

With reference to FIG. 1, the cleaning device 10 comprises a cleaning member 34 which may have an outer generally rectangular shape. The cleaning member 34 has an aperture 36 extending through the cleaning member 34, such that the cleaning member 34 may be mounted on the block 20 through use of a threaded bolt 38 which extends into a threaded bore 40 of the block or housing 20, or may have any other suitable device for mounting the cleaning member 34 on the block 20.

As shown in FIGS. 1-4, the cleaning member 34 has a threaded recess or cut-out 42 which is received on the threaded shaft 12, such that the cleaning member 34 extends partially around the periphery of the threaded shaft 12, with the threads 44 of the cleaning member 34 being meshed with or engaged with the threads 14 of the threaded shaft 12. The cleaning member 34 may be made from any suitable resilient material, such as nylon, a trademark of E. I. Dupont de Nemours, polyvinyl chloride, or polyethylene, or from a suitable rigid material, such as metal. In a preferred form, the cleaning member 34 may be snap-fit on the threaded shaft 12 into a configuration with the threads 44 of the cleaning member 34 meshing with the threads 14 of the shaft 12. The cleaning member 34 is secured at a fixed position on the threaded shaft 12 through use of the bolt 38 extending through the cleaning member 34 into the block 20, or other suitable mounting device.

The cleaning member 34 has a generally planar first side surface 46 facing the block 20 when the cleaning member 34 is secured to the block 20. The cleaning member 34 also has a second generally planar opposed second side surface 48 which is disposed at an angle relative to the first side surface 46 of the cleaning member 34, such that the angle must be equal to or greater than the thread angle. Also, the cleaning member 34 has an inner face 50 defining a first edge 52 of the threads 44 of the cleaning member 34 adjacent the threaded recess 42, and a second opposed edge 54 of the threads 44 adjacent the recess 42 of the cleaning member 34. In this configuration, the second edge 54 of the cleaning member 34 has a greater length of the threads 44 adjacent the second side surface 48 of the cleaning member 34 than the first edge 52 of the cleaning member 34. Thus, the edge 54 of the cleaning member 34 has threads 44 being directed in the edge 54 in an opposite angular direction relative to one direction of rotation of the threaded shaft 12. In this form, the edge 54 of the cleaning member 34 first contacts the threads 14 of the threaded shaft 12 prior to the threads 44 of the first opposed edge 52, such that the threads 44 in the second edge 54 scrape the threads 14 of the shaft 12, and remove dirt and dust which may accumulate on the threads 14 of the shaft 12. Thus, the cleaning member 34 forms a scraping edge of the threads 44 in order to remove dirt and dust from the threads 14 of the shaft 12 in one rotational direction of the shaft 12.

Figure 5:
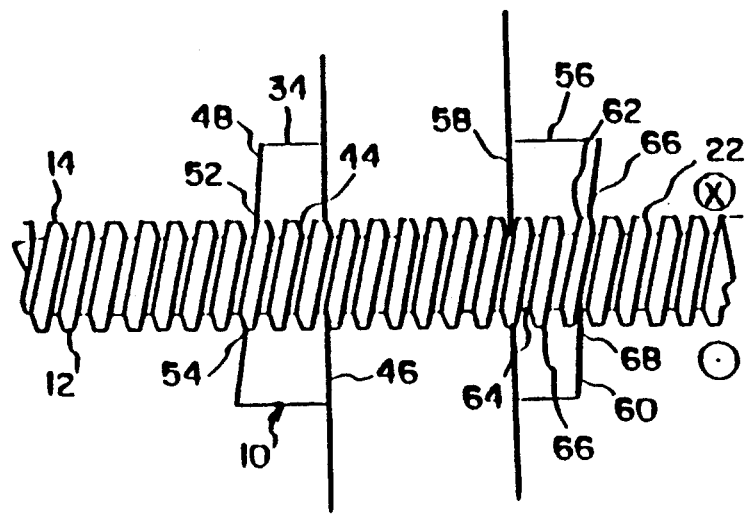
FIG. 5 is an elevational view, taken partly in section, of a pair of cleaning elements for a threaded shaft.

As shown in FIG. 5, the cleaning device 10 may also have a second cleaning member 56 of similar construction to the first cleaning member 34, and received on the threaded shaft 12 on an opposed side of the block 20. As discussed in connection with the first cleaning member 34, the second cleaning member 56 also has a threaded recess 66 received on the threaded shaft 12 with the second cleaning member 56 having a first generally planar side surface 58 facing the block 20, and a second opposed generally planar side surface 60 disposed at an angle relative to the first side surface 58 of the second cleaning member 56, such that the angle must be equal to or greater than the thread angle.

Figure 4:
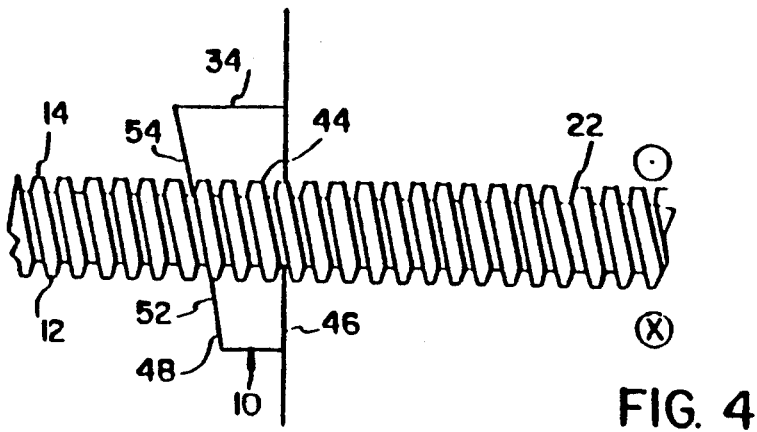
FIG. 4 is a rear elevational view, taken partly in section, of the cleaning member on a threaded shaft.

In this configuration, the second cleaning member 56 also has a first thread edge 62 having threads 64 directed in the opposite rotational direction of the threaded shaft 12 adjacent the side surface 60 of the second cleaning member 56. The second cleaning member 56 also has a second thread edge 68 adjacent the threaded recess 66. In this form, the first threaded edge 62 has a greater length of the threads 64 than the threads 64 of the second threaded edge 68, such that the first threaded edge 62 forms a scraping surface or cleaning edge for first contacting the threads 14 of the threaded shaft 12, as the shaft 12 is rotated in an opposite rotational direction relative to the direction of the shaft 12 previously discussed in connection with FIG. 4. Thus, the first threaded edge 62 scrapes and removes dirt and dust from the threads 14 of the shaft 12 during an opposite rotational direction of the shaft 12, as indicated by the arrow on the drawing. Thus, when the shaft 12 is rotated in one direction, as shown in FIG. 4, the second edge 54 of the first cleaning member 34 removes dirt and dust which may accumulate on the threads 14 of the shaft 12, while the first threaded edge 62 of the second cleaning member 56 removes dirt and dust from the shaft 12 as the shaft 12 rotates in an opposite rotational direction, resulting in cleaning of the shaft 12 in both rotational directions of the shaft 12.

Figure 6:
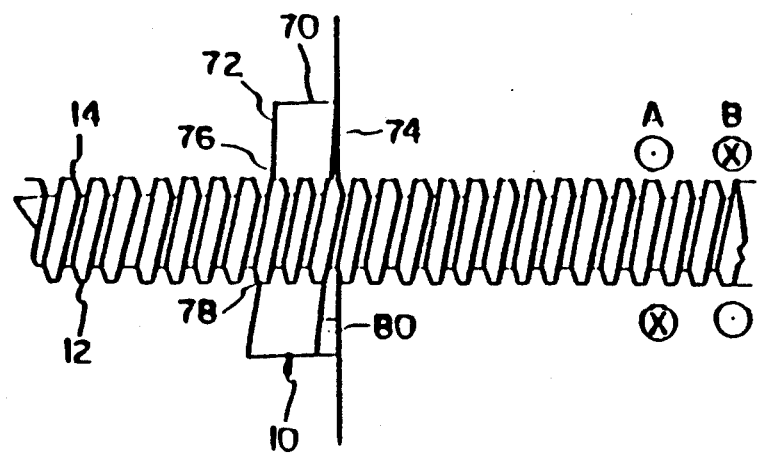
FIG. 6 is an elevational view, taken partly in section, of another embodiment of a cleaning element of the present invention.

Another embodiment of the cleaning member is illustrated in FIG. 6, in which like reference numerals designate like parts. In this embodiment, the cleaning member 70 has a pair of opposed generally planar side surfaces 72 and 74 which preferably define a side surface in the shape of a parallelogram, as shown. In this embodiment, the threads of the lower second edge 78 adjacent the side surface 72 scrape and remove dirt and dust from the threads 14 of the shaft 12, as the shaft 12 is rotated in an anti-clockwise direction A as indicated by the arrow in the drawings. However, the threads of the first edge 76 have a greater length than the threads of the second edge 78 adjacent the side surface 74, such that the threads of the first edge 76 scrape and remove accumulated dirt and dust from the threads 14 of the threaded shaft 12, in an opposite clockwise rotational direction B of the shaft 12. Thus the cleaning member 70 may clean dirt and dust from the threads 14 of the shaft 12 through use of the first and second edges 76 and 78 of the second cleaning member 70 during opposite rotational directions of the shaft 12. The cleaning device 10 may have a spacer 80 intermediate the cleaning member 70 and the block 20.

In this manner, the cleaning device 10 of the present invention removes dirt and dust from the threads 14 of the threaded shaft 12 in order to prevent possible impediment of rotation or jamming of the shaft 12. In addition, the cleaning member 34 is of simplified construction and reduced cost while cleaning the threads 14 of the shaft 12. The cleaning member 34 may be snap-fit onto the shaft 12 in order to facilitate attachment to the shaft 12 or removal from the shaft 12.

The foregoing detailed description is given for clearness of understanding only, and no unnecessary limitations should be understood therefrom, as modifications will be obvious to those skilled in the art.

What is claimed is:

1. A cleaning device for a threaded shaft being driven in first and second opposite rotational directions of the shaft comprising, a pair of spaced first and second cleaning members each having a threaded recess received on the shaft and extending only partially around the shaft, with the recess of each cleaning member extending laterally in the cleaning members in a direction along the shaft after placement of the cleaning members on the shaft, such that the cleaning members may be removed from the shaft through the respective recesses, said cleaning members being snap-fitted onto the shaft through the respective recesses of the cleaning members, with the threads of the cleaning member being meshed with the threads of the shaft, said first cleaning member having a first edge of the threads and a second edge of the threads, with said second edge having a greater length of the threads than the first edge adjacent one side of the first cleaning member, and with the threads of the second edge of the first cleaning member being directed away from one rotational direction of the shaft, said second cleaning member having a first edge of the threads and a second edge of the threads, with said first edge of the second cleaning member having a greater length of the threads than the second edge adjacent one side of the second cleaning member, and with the threads of the first edge of the second cleaning member being directed away from the other rotational direction of the shaft, such that the second edge of the first cleaning member and the first edge of the second cleaning member scrape the threads of the shaft in opposite rotational directions of the shaft.

* * * * *